United States Patent [19]

Rolles et al.

[11] 4,138,511

[45] Feb. 6, 1979

[54] METHOD OF PRODUCING GLOSSY OR FROSTED POWDER COATINGS

[75] Inventors: Rolf Rolles; James E. Williams, Jr., both of New Kensington; Thomas J. Kondis, Pittsburgh, all of Pa.

[73] Assignee: Aluminum Company of America, Pittsburgh, Pa.

[21] Appl. No.: 682,057

[22] Filed: Apr. 30, 1976

Related U.S. Application Data

[60] Continuation of Ser. No. 505,236, Sep. 12, 1974, abandoned, which is a division of Ser. No. 380,578, Jul. 19, 1973, Pat. No. 4,003,872.

[51] Int. Cl.² .......................... B05D 1/36; B05D 7/00
[52] U.S. Cl. .................................... 427/201; 427/195; 427/222; 428/144; 428/403
[58] Field of Search .............. 260/40 R, 42.22, 37 EP, 260/37 M; 427/195, 27, 29, 222, 185, 201; 428/144, 403

[56] References Cited

U.S. PATENT DOCUMENTS

| | | | |
|---|---|---|---|
| 2,054,454 | 9/1936 | Thies et al. | 106/23 |
| 2,078,808 | 4/1937 | Reardon et al. | 134/76 |
| 2,303,504 | 12/1942 | Ryan | 427/222 |
| 2,432,465 | 12/1947 | Babcock | 106/290 |
| 2,666,714 | 1/1954 | Halberstadt | 106/290 |
| 2,761,854 | 9/1956 | Coler | 260/38 |
| 2,878,145 | 3/1959 | Aid et al. | 117/145 |
| 2,947,646 | 8/1960 | Devaney et al. | 106/93 |
| 2,974,059 | 3/1961 | Gemmer | 427/195 X |
| 2,974,060 | 3/1961 | Dettling | 427/195 X |
| 3,041,303 | 6/1962 | Nelson | 260/41.5 |
| 3,183,113 | 5/1965 | Gemmer | 427/195 X |
| 3,234,038 | 2/1966 | Stephens et al. | 427/409 X |
| 3,336,251 | 8/1967 | Manasia | 260/18 |
| 3,389,105 | 6/1968 | Bolger | 260/23 |
| 3,503,919 | 3/1970 | Cadus | 260/37 |
| 3,591,409 | 7/1971 | Audrey et al. | 427/222 |
| 3,632,369 | 1/1972 | Hahn | 427/222 |
| 3,677,980 | 7/1972 | Last | 260/2.5 HA |
| 3,692,731 | 9/1972 | McAdow | 260/32.8 R |
| 3,697,070 | 10/1972 | McAdow | 106/291 |
| 3,723,165 | 3/1973 | Longo et al. | 260/47 C X |

FOREIGN PATENT DOCUMENTS

691795 8/1964 Canada.
1111057 7/1954 France.

*Primary Examiner*—Shrive P. Beck
*Attorney, Agent, or Firm*—Daniel A. Sullivan, Jr.

[57] ABSTRACT

A method of using a powder product consisting essentially of thermoplastic or thermosetting polymer based plastic particles and mutually separated, metal flake particles which lie with their faces attached to the surfaces of the plastic particles, said method including applying said powder product to a surface and then melting the plastic particles to form a continuous film on the surface, this being followed by subsequent solidification of the film to obtain a coating of the surface. In an alternate form of the invention, the metal flake particles cover the plastic particles, the quantity of metal flake particles being such that coalescence is inhibited to give a rough, frosted metallic appearance to the surface.

1 Claim, 6 Drawing Figures

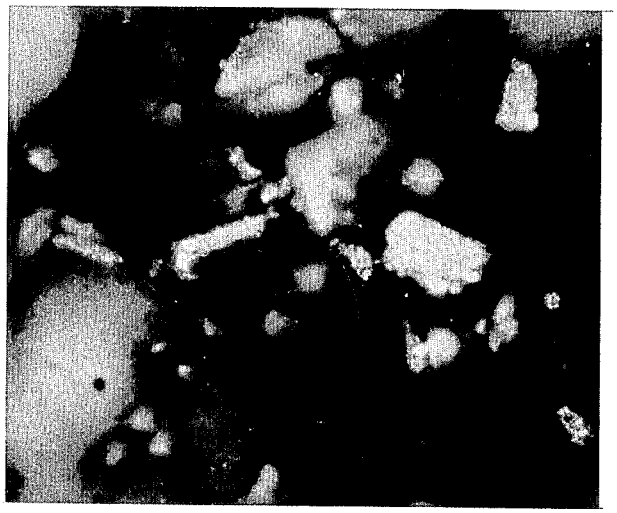
FIG 4 |←— X —→|
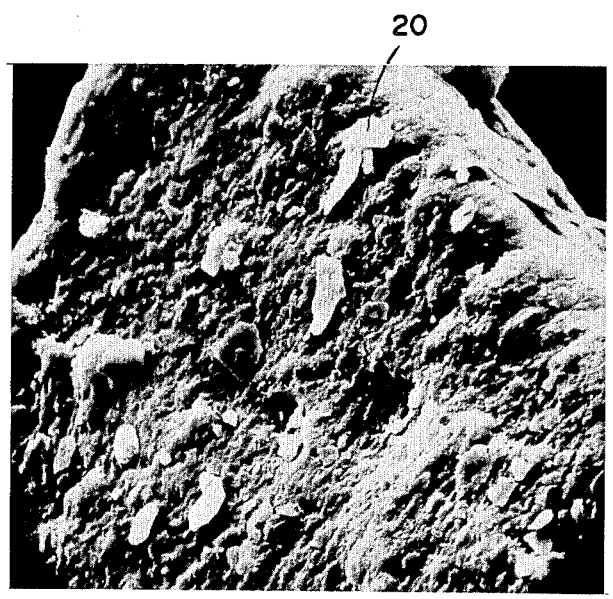
FIG 5 |←— Y —→|

METHOD OF PRODUCING GLOSSY OR FROSTED POWDER COATINGS

CROSS-REFERENCE TO RELATED APPLICATION

This is a continuation of application Ser. No. 505,236, filed Sept. 12, 1974 now abandoned. Application Ser. No. 505,236 is a division of application Ser. No. 380,578, filed July 19, 1973, now U.S. Pat. No. 4,003,872.

BACKGROUND OF THE INVENTION

The present invention relates to metal-pigmented, plastic powder.

Conventional metal-pigmented plastic powder coatings produced by melting appropriate powder into a film have often beeen characterized by a nonuniform gray-metallic appearance, having lower gloss and total reflectance than might be desired. This is in contrast to the uniform brighter metallic effect obtainable with coatings produced by use of metal-pigmented, organic solvent solutions of plastic.

It would be desirable to be able to obtain with metal-pigmented plastic powder coatings an improved, uniform, bright metallic appearance. It would be desirable to be able to obtain an improved brightness and specularity approaching, for example, the mirror-like qualities of chrome-plate. In addition, it would be highly desirable to reduce the hazards, e.g. explosions, to safety associated with particle separation and electrical discharge during electrostatic spraying.

SUMMARY OF THE INVENTION

In view of the disadvantages cited, it is an object of the present invention to provide a metal-pigmented, plastic powder product giving, when melted into a continuous film to form a coating on a surface, a coating of improved gloss, total reflectance, and metallic appearance.

Another object of the present invention is to provide a metal-pigmented, plastic powder product providing improved orientation of the metal pigment parallel to, and near or at, the surface of the coating, as well as having an improved uniformity in the distribution of metal pigment throughout itself and throughout coatings obtained upon melting it into a continuous film coating.

Yet another object of the present invention is to provide a metal-pigmented, plastic powder product having an improved resistance to sparking when applied by electrostatic spraying onto a surface to be coated.

Additionally, it is an object of the present invention to provide a metal pigmented, plastic powder product exhibiting, in a coating produced from it by melting, improved gloss, total reflectance, metallic appearance and uniformity in the distribution of metal pigment throughout the coating.

Another object of the present invention is to make it possible safely to obtain polychromatic coatings through the technique of applying and then melting a plastic powder product in a continuous film on a metal surface.

These as well as other objects which will become apparent in the discussion that follows are achieved according to the present invention by:

(1) A powder product and consisting essentially of plastic particles and metal flake particles capable of being melted to yield in a continuous film an 85° gloss of at least 80%, a 60° gloss of at least 100%, a total reflectance of at least 50%, and a 45° gloss of at least 55% (half-scale reading);

(2) A powder product consisting essentially of plastic particles and metal flake particles and capable of being melted to yield in a continuous film 20°, 60°, and 45° (half-scale reading) glosses of at least 100% and a total reflectance of at least 50%;

(3) A powder product consisting essentially of plastic particles and mutually separated, metal flake particles which lie with their faces adhered to the surfaces of the plastic particles; and (4) A powder product consisting essentially of plastic particles and metal flake particles, the plastic particles being covered by metal particles, which are attached to the plastic particles.

As used herein, the terms "20° gloss," "60° gloss," and "85° gloss" are values conventionally measured in the art, and the procedure for obtaining those values is described in ASTM Specification D523-53T. The "45° gloss" is as measured on a Photovolt Corporation Model 610 instrument using a 45° gloss head, i.e., 660-M head for metallic surfaces. Because of metallic reflectance, the scale reading for most metal-pigmented coatings exceeds 100% which is scale maximum when measuring 45° gloss. Therefore, during standardization the instrument was adjusted to read exactly one-half of the designated value of the standard, allowing sample readings to be within scale limitations and exactly one-half of their true value. Gloss and gloss measurements are described in Chapter 1.2 of the *Paint Testing Manual*, 13th Edition, 1972, ASTM Special Technical Publication 500. Total reflectance is measured on a G. E. Taylor-Baumgartner Total Reflectometer.

GENERAL ASPECTS OF THE INVENTION

It is believed that the nonuniformity in appearance and reduced metallic effect of conventional metal-pigmented plastic powder coatings have been the result of improper orientation of the metal flake in the film and nonuniform distribution of metal flakes and other pigments throughout the coating. It is also believed that particle segregation due to both the density and electrical conductivity differences between metal flake particles and plastic particles contribute to the nonuniform distribution of these particles in conventional metal-pigmented plastic powder coatings. This particle segregation not only creates a nonuniform appearance in the applied coating, but also, coupled with the presence of individual, discrete particles of aluminum, causes a tendency for the powder to produce electrical discharges, i.e. sparking, during the electrostatic spraying of the powder onto a grounded surface to be coated.

According to a process for producing the products of the invention, flake-shaped metal particles and plastic particles are charged into a brush polisher and there dry polished into a metal-pigmented plastic powder product. During the polishing operation, the plastic and metal particles are de-agglomerated, polished, and mixed. In the resulting product, the metal flakes tend to adhere to and become embedded on the plastic particles, maintaining a nonsegregating, homogeneous blend of metal particles and plastic particles and allowing an increased number of metal flake particles to orient themselves parallel, and at or near, to the surface of a coating formed from the product by melting and curing on, for example, a steel substrate..

Brush polishers have been known for a number of years and are characterized by a cylindrical drum or the like in which revolve polishing brushes. See for example, U.S. Pat. No. 1,930,683 of Erwin Kramer issued Oct. 17, 1933, for a "Polishing Machine for Colored Pulverulent Bronze".

Aluminum flake powder is an example of flake-shaped metal particles which can be used in the process. Appropriate aluminum flake powder can be produced according to known techniques by steel-ball milling aluminum powder particles. This forms the particles into flake shapes. See for example, U.S. Pat. No. 1,569,484 E. J. Hall issued Jan. 12, 1926, for a "Process and Method of Disintegrating Metals in a Ball Mill or the Like".

Aluminum flake powder usable in the process may or may not have been previously polished.

Besides aluminum, other exemplary metals which can be processed in flake form are gold bronze (copper-zinc alloys) and zinc.

In the field of flake metal particles, a distinction is drawn between "leafing" particles and "nonleafing" particles. In general, leafing particles are characterized by the presence of a coating on the particles which causes the particles not to be wet by the liquid matrix in which they are placed. Examples of such coatings are stearic acid and the lubricants disclosed in U.S. Pat. No. 1,920,234 issued Aug. 1, 1933, to Furmen C. Arthur for a "Method of Producing Aluminum Bronze Powder and Lubricants Therefor". Leafing-type aluminum particles, when applied in the present invention of making aluminum-colored coatings, tend to give brighter coatings. Nevertheless, significant improvements in aluminum-colored coatings have been found when practicing the present invention even for the case of non-leafing metal flake particles.

Another type of metal particles which can be charged to a brush polisher in the process is vacuum deposited, very thin, metal flakes such as those disclosed in U.S. Pat. No. 2,839,378 issued June 17, 1958, to Walter G. McAdoorn et al, for a "Method of Making Metal Flakes".

Yet another type of metal flake particles which can be brush polished with plastic particles in the process is characterized by having most of the weight of the particles in its particle size distribution within a narrow size range and by having particle size distribution modes from 7 to 15 microns as measured by a Coulter Counter.

In general, a wide range of plastic particles are applicable according to the present invention. The plastic particles must, however, exhibit the ability to melt under the influence of increased temperature and coalesce to form a continuous film on the surface of an object to which the powder product of the invention has been applied. Both thermoplastic and thermosetting polymer based particles are applicable. In the case of thermoplastic particles, the temperature is raised to cause melting and coalescence. Then, with decreasing temperature, the resulting film hardens in place. In the case of thermosetting plastic particles, these typically will undergo melting, followed by coalescence of the plastic material into a continuous film. With continued residence at elevated temperature, the thermosetting polymer molecules will cross-link so that the film cures into a hard, permanent coating. No appreciable cross-linking must occur in the thermosetting plastic particles during the brush polishing. For example, in a brush polisher operating at up to 100° F, the minimum cross-linking temperature must be above 100° F.

The plastic particles to be charged to a brush polisher in the present invention may contain other substances besides the polymer molecules of a resin. For example, they may contain, within their bodies, metal particles, hiding pigment such as $TiO_2$, organic or inorganic color-pigments such as phthalocyanine or iron oxide, flow control agents such as Modaflow, a product of Monsanto Company, St. Louis, Missouri, filler or extender pigments, plasticizers, and the like. Exemplary polymer molecules are epoxy resin, acrylics, mixed esters such as cellulose acetate butyrate, and polyterephthalate (PCDT).

Plastic particles containing metal particles within their bodies may be made by the so-called hot melt techniques. It is a possible economic advantage, however, that the bodies of the plastic particles may be free of metal particles.

Powder products suitable for being melted into continuous film, polychromatic, powder coatings can be produced by the process by employing as the plastic particles those containing organic or inorganic color pigments such as phthalocyanine or iron oxide. Another technique is to operate the process using, for example, clear or white-pigmented plastic particles; following brush polishing, the resulting powder product is mixed with color-pigmented plastic particles produced by any suitable conventional process and lacking the adherent metal flake particles.

The relative amounts of metal flake particles and plastic particles to be charged to the brush polisher in the present invention is determined by a number of factors. For example, too small a quantity of metal particles will lead to a condition wherein an unsatisfactory percentage of the coating actually contains metallic, reflective matter, thus giving rise to a nonuniform effect. The weight of metal flake particles actually needed in any instance to provide a desired amount of metallic matter in a coating will depend on the specific surface area of the particular metal flake particles being used, as measured in meters$^2$ per gram or, alternatively in the case of leafing particles, on the covering area as measured in square centimeters per gram. In general, increasing the amount of metal flake particles relative to the plastics particles will make the coating brighter and more metallic. There comes a point, however, at which further addition of metal flake particles gives no added benefit, since one observes only those metal flake particles highest in the surface. An upper limit on the relative amount of metal present is also dictated by the danger of sparking during electrostatic deposition of a coating. In general, the metal content is less than 30 weight-% as based on the total weight of the metal particle plastic particle mixture.

In charging a brush polisher with metal flake particles and plastics particles, it has been found that an optimum charge weight usually exists for any given polisher. For example, if too much material is charged to the brush polisher, the polishing effect can become inadequate and erratic, similar to that attained in dry blending. It is believed that high quality of product can be maintained down to infinitesimally low charge weights, such practice, however, in general not being recommended for economic reasons.

Particularly in the case of thermosetting resins, it is important in the present invention that the temperature in the brush polisher be maintained below the range at which melting and cross linking occurs. It may become necessary to provide cooling of the brush polisher, for example, by directing air against the external surface of its drum. Jacketing of the drum of a brush polisher is an alternative method in which water cooling may be used.

As a general rule, increased time of treatment of the combined metal-flake plastic-particle charge in a brush polisher according to the present invention has been found to increase the gloss and metallic appearance of a coating made by melting the resulting metal-pigmented plastic powder product into a continuous film.

Observation of the metal-pigmented plastic particle product of the present invention microscopically shows that the metal flake particles are essentially mutually separated, i.e. de-agglomerated, and attached to the surface of the plastic particles.

It is believed that this attachment of mutually separated, metal flake particles to the plastic particles is of significance in obtaining the advantages of the present invention, for instance the improved metallic appearance and greater gloss and reflectance in the case of aluminum-colored coatings and for instance the improved metallic appearance obtainable in polychromatic coatings.

The fact that the metal flake particles are held on the plastic particles surfaces, as contrasted with the submerged situation of the metal flake particles within plastic particle bodies in metal-pigmented, powder products made by hot melt techniques, means that more metal flake particles end up parallel, and at or near, to the surface of a continuous film coating formed by melting the metal-pigmented, plastic particle product of the invention. That increased time of brush polishing increases gloss and metallic appearance could be explained by the greater resultant de-agglomeration and spreading of the metal flake particles over the plastic particle surfaces. This attachment of the metal particles to the plastic particles restricts segregation of particles due to both density and electrical conductivity differences between the metal flake particles and plastic particles. Segregation could otherwise occur during handling and electrostatic, flocking, fluidized-bed, or the like, application to a substrate. The lack of segregation appears to contribute to the more uniform appearance as compared to conventional metal-pigmented plastic powders. Adherence of the aluminum flakes to the plastic particles is believed to lower explosion hazards during electrostatic spraying by reducing the tendency for the powder to produce electrical discharges, i.e. sparking.

BRIEF DESCRIPTION OF THE DRAWINGS

FIG. 4 is a photomicrograph of an exemplary particle product of the present invention, magnification being characterized by the distance x equaling $2 \times 10^{-3}$ inches.

FIG. 5 is a scanning electron photomicrograph of a single plastic particle of the product of FIG. 4, magnification being characterized by the distance y equaling $5 \times 10^{-4}$ inches.

PREFERRED EMBODIMENTS OF THE INVENTION

Figure 1:
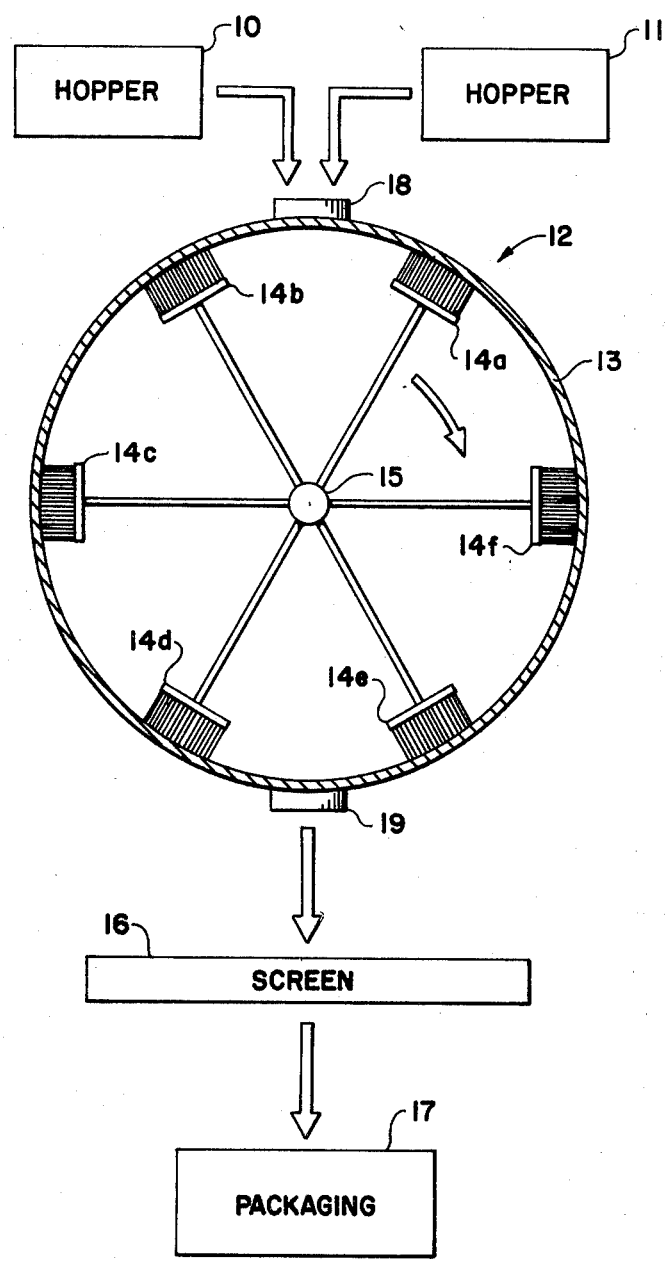
FIG. 1 is a schematic flow diagram of a process for making the products of the present invention.

Referring firstly to FIG. 1, a process for making the products of the invention is illustrated in schematic form. Plastic particles and metal flake particles are charged from their respective hoppers 10 and 11 into brush polisher 12 through port 18. The brush polisher is of a design to include a cylindrical drum 13 and six brushes 14a through 14f mounted integrally to shaft 15. The brushes, which are made typically of hog bristle, bear against the inner surface of the drum. Shaft 15 is rotated by a motor (not shown) so that the brushes continually move relative to the inner surface of drum 13. A given charge of plastic particles and metal flake particles are brush polished for a desired length of time and then emptied through port 19 onto a screen 16, with the material passing through the screen being brought directly to a packaging area 17. The screen functions to remove from the discharge any loose bristles or oversized agglomerates. In addition to screens, or in place thereof, other particle classification devices, such as centrifuges, cyclones, etc. can be employed. Because most of the aluminum particles are adhered to or embedded in plastic particles, particle segregation during these types of classification is not the serious problem with the product of this invention as it would be with many conventionally produced metal-pigmented plastic powder coatings.

According to one embodiment of the process, flake aluminum powder characterized by a surface area of 0.5 to 17 square meters per gram is charged to a brush polisher together with thermosetting epoxy resin based plastic particles of 1.15 to 1.98 specific gravity, average 0.8 grams per milliliter bulk density, particle size distribution characterized by 85 weight percent from 30 to 50 microns, 185° to 205° F. melting point, time to gel approximately 100 120 seconds at 360° F., and volatiles less than one weight percent at full bake (including moisture that may be on powder). The amount of aluminum powder is from 0.75 to 3 parts by weight per 100 parts by weight of plastic particles. More preferably, the amount of aluminum is 1.37 parts by weight per 100 parts by weight of plastic particles.

Further illustrative of the present invention are the following examples:

EXAMPLE I

Figure 6:
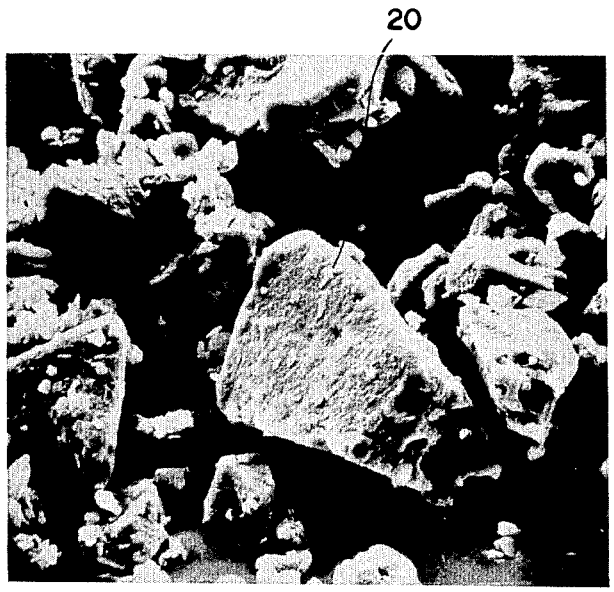
FIG. 6 is a scanning electron photomicrograph of the product shown in FIG. 4, magnification being characterized by the distance z equaling $2 \times 10^{-3}$ inches.

Into a mechanical blender were charged 176 pounds of thermosetting epoxy resin based plastic particles, for example Flintflex Powder Coating No. 531-6001, which is a white plastic material containing titanium dioxide and available from the DuPont Company of Wilmington, Del., and two pounds six ounces of flake-particled aluminum powder, for example Alcoa Extra Fine Lining Powder No. 422, which is a polished aluminum powder available from Aluminum Company of America, Pittsburgh, Pa. Properties characterizing the Flinflex thermosetting epoxy resin based powder utilized in this example are as follows: A specific gravity of 1.53 to 1.78, average 0.8 grams per milliliter bulk density, particle size distribution characterized by 85 weight percent from 30 to 50 microns, 185° to 205° F. melting point, time to gel approximately 100 to 120 seconds at 360° F., and volatiles less than one weight percent at full bake (including moisture that may be on powder). Properties characterizing the Alcoa Aluminum Extra Fine Lining Powder No. 422 are as follows: A nominal total surface area of 16 square meters per gram, a particle size distribution characterized by 100% passing through a 325-mesh Tyler screen, and an average leafing value of 75% as determined with a one-gram sample according to A.S.T.M. Specification - D480-59T. A carbon dioxide flue gas was provided as the atmosphere in the blender to guard against the danger of explosion. The temperature in the blender was maintained at 80° F. The blended mixture was fed in a quantity of 80 pounds into a brush polisher containing the inert atmosphere provided for in the blender and having a cylinder inner diameter of 30 inches and a cylinder length of 36 inches, the length extending to the horizontal. Rotational speed of the brush polisher was 55 rpm. There were six brushes each of which extended the length of the drum and had a width, as measured in the direction of the circumference of the drum, equaling, 2¼ inches. Bristle length was one inch. Brush polishing was carried out for 12 hours during which time the temperature was maintained between 90° and 100° F. The resulting product is shown in FIGS. 4, 5, and 6. The product is characterized by the aluminum flakes being dispersed into their very small individual flake particles, this being particularly apparent in the optical photomicrograph of FIG. 4, and by the adherence of the major portion of the aluminum particles to plastic particles. Also representative of adhering and embedded aluminum particles is particle 20 in FIGS. 5 and 6. Note that FIG. 5 is simply a picture at greater magnification of part of the largest particle in FIG. 6. It will be observed in FIGS. 5 and 6 that the metal flake particles are essentially coplanar with the particular plastic particle surface areas where they are attached. It is believed that some softening of the plastic particles occurs during polishing to cause adhesion with the aluminum flakes.

Figure 2:
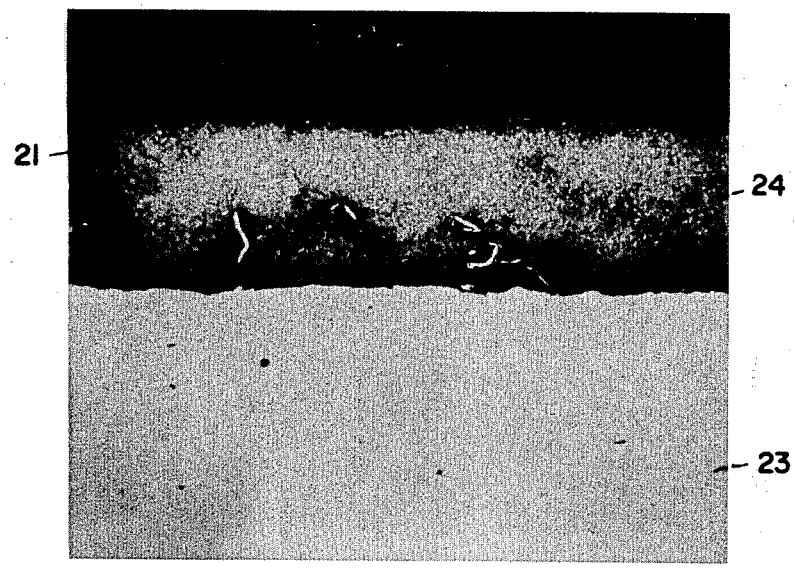
FIG. 2 a photomicrograph of a section through a steel object provided with a coating according to the present invention.
Figure 3:
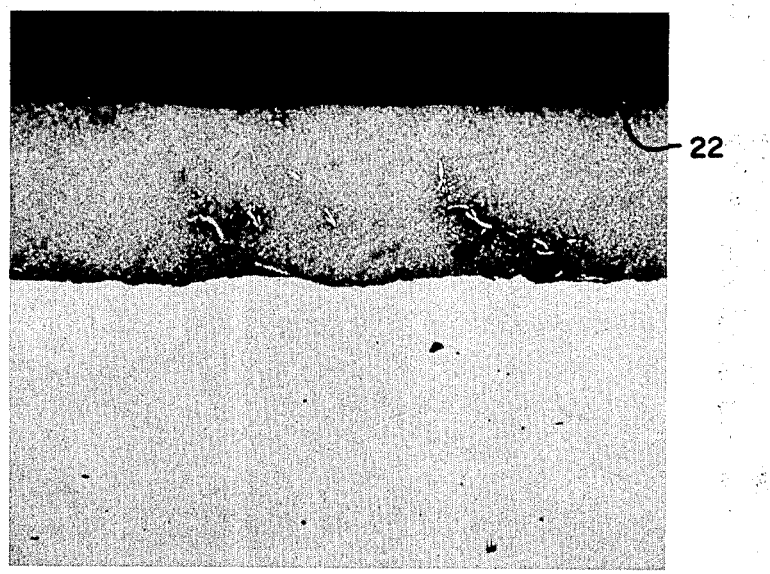
FIG. 3 is a photomicrograph as in FIG. 2 of a coating produced using a prior metal pigmented plastic particle coating.

FIG. 2 illustrates a coating. This coating was made by charging the metal-pigmented plastic powder product of this Example I into the hopper of an electrostatic spray gun, for example, Ashdee Model No. HP1, Ashdee Corporation, Evansville, Ind., and spraying onto a, for example, 0.032-inch thick cold rolled steel panel 23 at a distance of approximately 12 inches under a voltage drop of 60 kilovolts. The steel panel was placed in a furnace and baked for 20 minutes at 360° F. The resulting continuous plastic film 24 had a thickness of about 2 mils. For purposes of comparison, FIG. 3 is the coating obtained using a particle product which has been simply dry mixed in a blender. The greater amount of thin, white-appearing, bordering 21 along the upper coating surface in FIG. 2 as compared with the relatively sparse presence of bordering 22 in FIG. 3 is indicative of the greater population of metal particles on the surface obtained using metal-pigmented plastic powder coating product made according to the present invention. The coating of FIG. 2 is very brilliant and specular, i.e. has an appearance approaching that of chrome plate, has 20°, 60°, and 45° (half-scale reading) glosses greater than 100%, an 85° gloss greater than 95% and a total reflectance greater than 50%.

EXAMPLE II 150 pounds of thermosetting epoxy resin based powder coating, e.g. Flintflex 531-6001 Example I, and 2.06 pounds of aluminum flake particles, e.g. Alcoa No. 422 of Example I, were charged without blending to the brush polisher of Example I and polished for a period of 6 hours under the same polishing conditions. The resulting material was screened through a double screen having a first screen of Tyler 12-mesh size and a second screen of Tyler 74-mesh size for the purpose of removing oversized agglomerates and foreign materials such as brush bristles. Gloss and total reflectance of coatings made as in Example I with the product of this example were substantially identical to the properties obtained for the product of Example I.

EXAMPLE III

Procedure was identical to that of Example II, except that polishing was for a duration of only 15 minutes. Coating properties were as follows: an 85° gloss greater than 80%, a 45° gloss greater than 55% (half-scale reading), and a total reflectance greater than 50%. The coating of this example was more diffuse in appearance, i.e. had less specularity, than the coating produced with the product of Example II.

EXAMPLE IV 100 grams of thermosetting expoxy resin based plastic powder, e.g. Flintflex 531-6035, which is a white plastic material containing titanium dioxide and available from the DuPont Company of Wilmington, Delaware, and 4.5 grams of flake-particled gold bronze powder (copper-zinc alloy), e.g. U.S. Bronze No. 13 Palegold which is available from United States Bronze Powders, Inc., Flemington, N.J. were charged without blending into a brush polisher. The properties at Flintflex 531-6035 are very similar to those for Flintflex 5316001 described in Example I, except for some differences in pigmentation. The polisher was a laboratory model having a cylinder inner diameter of 6 inches and a cylinder length of 9½ inches, the length extending in the horizontal. Rotational speed of the brush polisher was 100 rpm. There were 2 brushes each of which extended the length of the drum and had a width, as measured in the direction of the circumference of the drum, equaling ½ inch. Brush polishing was carried out for 15 minutes. The coating when applied to a steel panel and cured as in Example I resulted in a copper-colored metallic finish with individual, bright gold bronze flakes evident throughout the coating. Depending on the concentration, surface area, and color of the particular gold bronze chosen, this example may be varied to provide anywhere from a pale bronze to a rich deep bronze.

EXAMPLE V

The procedure was identical to that of Example IV, except that polishing was conducted for a duration of 6 hours. Coating appearance was very similar to that of Example IV, except for a slightly more intense copper color.

EXAMPLE VI 100 grams of thermosetting epoxy resin based plastic powder, e.g. Flintflex 531-6035, and 3.63 grams of flake-particled zinc powder, e.g. Bright Zinc Flake which was obtained from Tainton Products Division of Freeport Sulphur Company, Baltimore, Md., were charged without blending into the brush polisher of Example IV. Brush polishing was carried out for 15 minutes. The coating, applied and cured as in Example I, was light gray in color with individual particles of zinc flake appearing uniformly distributed throughout the film.

EXAMPLE VII

The procedure was identical to that of Example VI, except that polishing time was 6 hours. Coating appearance was also similar to that of Example VI, except that the color was a deeper shade of gray.

EXAMPLE VIII 200 grams of clear thermosetting acrylic resin based plastic powder and 2.7 grams of flake aluminum powder, e.g. Alcoa No. 422, were charged without blending into the brush polisher of Example IV. Brush polishing was carried out for 15-½ hours. The coating, applied and cured as in Example I, had a very rough, frosted metallic appearance. This is believed to be an example of what happens when the plastic particles are so completely covered by metal particles that coalescence is inhibited somewhat.

EXAMPLE IX

The procedure was identical to that of Example VIII, except that brush rotational speed was adjusted to 54 rpm, and polishing was carried out for 13 hours. The coating, applied and cured as in Example I, had better flow properties, i.e. produced a smoother film coating, and was considerably brighter than that from Example VIII.

EXAMPLE X 200 grams of thermoplastic cellulose acetate butyrate resin based plastic powder, e.g. Tenite CAB 7400W-0W030, which is a clear plastic material available from Eastman Chemical Products, Inc., Kingsport, Tenn., and 2.7 grams of flake aluminum powder, e.g. Alcoa No. 422, were charged without blending into the brush polisher of Example IV. Brush polishing was carried out for 30 minutes. The coating, applied and cured as in Example I, had a very bright metallic appearance.

EXAMPLE XI 200 grams of thermoplastic polyterephthalate resin based plastic powder, e.g. Tenite PCDT 7500W-SW010, which is a white pigmented plastic material from Eastman Chemical Products, Inc., Kingsport, Tenn., and 2.7 grams of flake aluminum powder, e.g. Alcoa No. 322, were charged without blending into the brush polisher of Example IV. Brush polishing was performed for 30 minutes. The coating, applied and cured as in Example I, had a textured metallic appearance.

EXAMPLE XII 100 grams of thermosetting epoxy resin based plastic powder, e.g. Flintflex 531-6035, and 1.37 grams of nonleafing flake aluminum powder, e.g. Alcoa Nonleafing Tinting Paste No. 7370 which had been dried to remove all solvent in a vacuum oven, were charged without blending into the brush polisher of Example IV. Brush polishing was carried out for 15 minutes. The coating, applied and cured as in Example I, had an appearance very similar to that of Example III.

EXAMPLE XIII 200 grams of blue-color-pigmented, thermosetting epoxy resin based plastic powder, e.g. Quality Blue Flintflex 521-6016 and 2.74 grams of nonleafing flake aluminum powder, e.g. Alcoa Nonleafing Tinting Paste No. 7370, which has been vacummed dried to remove all solvent were polished for 15 minutes in a brush polisher as described in Example IV to make a polychromatic coating. Application to form a coating is as in Example I.

EXAMPLE XIV 100 grams of thermosetting epoxy resin based plastic particles, e.g. Fintflex 531-6035, 0.75 grams of aluminum flake particles, e.g. Alcoa No. 422, and enough organic solvent, e.g. hexane, to prepare a thin slurry were charged, after slurrying, into the brush polisher of Example IV. Organic solvent may also be added by using aluminum flake in the form of an aluminum flake-organic solvent paste, as well as separately in the manner of this Example. The slurry was brush polished for 6 hours at the same 100 rpm of Example IV, after which it was filtered to remove excess solvent and then air dried. Smaller quantities of organic solvent, insufficient to slurry the metal flake particles and plastic particles, such as the organic solvent that is present in commercial metal flake-organic solvent paste can be gotten rid of by volatilization during polishing and venting with a gas stream provided as a polishing atmosphere. A coating, applied as in Example I, had a more uniform, deep aluminum color than dry brush polished powders of equal metal concentration brush polished likewise for six hours under otherwise the same conditions and was very similar in appearance to a dry brush polished aluminum pigmented plastic powder containing 2.0 grams of metal flake per 100 grams of plastic powder also brush polished for six hours under otherwise the same conditions. These results illustrate the more efficient action according to the process of the invention when organic solvents are added to the brush polisher, providing for improved de-agglomeration and attachment of the metal flake particles to the plastic particles. The technique of this Example is, however, less economical than dry polishing, because the product must be later treated for removal of the solvent, for example by filtration and drying.

It will be understood that the above description of the present invention is susceptible to various modifications, changes, and adaptations and the same are intended to be comprehended within the meaning and range of equivalents of the appended claims.

What is claimed is:

1. A method of using a powder product consisting essentially of thermoplastic or thermosetting polymer based plastic particles and metal flake particles, the plastic particles being covered by the metal flake particles, which lie with their faces attached to the plastic particles, said method comprising applying said powder product to a surface and then melting the plastic particles, this being followed by subsequent solidification of the plastic as a coating on the surface, the quantity of metal flake particles in the powder product being such that coalescence is inhibited, whereby a rough, frosted metallic appearance is given to the surface.

* * * * *

UNITED STATES PATENT AND TRADEMARK OFFICE
CERTIFICATE OF CORRECTION

PATENT NO. : 4,138,511
DATED : February 6, 1979
INVENTOR(S) : Rolf Rolles et al.

It is certified that error appears in the above—identified patent and that said Letters Patent are hereby corrected as shown below:

| | |
|---|---|
| Col. 1, line 61 | After "product" change "in" to --into--. |
| Col. 1, line 66 | After "product" delete "and". |
| Col. 3, line 57 | After "based" insert --plastic--. |
| Col. 5, line 16 | Change "surface" to --surfaces--. |
| Col. 5, line 26 | Change "particles" to --particle--. |
| Col. 6, line 41 | After "100" insert --to--. |
| Col. 6, lines 61 & 62 | Change "Flin-flex" to --Flintflex--. |
| Col. 7, line 16 | After "extending" change "to" to --in--. |

UNITED STATES PATENT AND TRADEMARK OFFICE
CERTIFICATE OF CORRECTION

PATENT NO. : 4,138,511

DATED : February 6, 1979

INVENTOR(S) : Rolf Rolles et al.

It is certified that error appears in the above—identified patent and that said Letters Patent are hereby corrected as shown below:

| | |
|---|---|
| Col. 8, line 24 | Change "expoxy" to --epoxy--. |
| Col. 8, line 31 | After "properties" change "at" to --of--. |
| Col. 10, line 15 | Change "Fintflex" to --Flintflex--. |

Signed and Sealed this

Fifth Day of June 1979

[SEAL]

Attest:

RUTH C. MASON
Attesting Officer

DONALD W. BANNER
Commissioner of Patents and Trademarks